(12) United States Patent
Severinsson

(10) Patent No.: US 7,258,206 B2
(45) Date of Patent: Aug. 21, 2007

(54) DISC BRAKE

(75) Inventor: Lars MaHis Severinsson, Hishult (SE)

(73) Assignee: Haldex Brake Products AB (SE)

( * ) Notice: Subject to any disclaimer, the term of this patent is extended or adjusted under 35 U.S.C. 154(b) by 254 days.

(21) Appl. No.: 10/507,296

(22) Filed: Sep. 9, 2004

(65) Prior Publication Data

US 2005/0247527 A1 Nov. 10, 2005

Related U.S. Application Data

(63) Continuation of application No. PCT/SE2003/000290, filed on Feb. 21, 2003.

(60) Provisional application No. 60/359,720, filed on Feb. 27, 2002.

(30) Foreign Application Priority Data

Feb. 21, 2002 (SE) .................................... 0200495

(51) Int. Cl.
*F16D 55/08* (2006.01)
*F16D 55/26* (2006.01)
(52) U.S. Cl. .................................... 188/72.7; 188/72.6
(58) Field of Classification Search ............... 188/72.7, 188/72.3, 72.6
See application file for complete search history.

(56) References Cited

U.S. PATENT DOCUMENTS

| | | | | |
|---|---|---|---|---|
| 2,375,152 A * | 5/1945 | Turner | ...................... | 188/71.7 |
| 3,543,285 A * | 11/1970 | Frigger | .................... | 188/106 F |
| 3,651,897 A * | 3/1972 | Hahn | ......................... | 188/72.2 |
| 3,662,864 A * | 5/1972 | Evans | ......................... | 188/72.2 |
| 3,721,321 A * | 3/1973 | Yarber | ........................ | 188/72.6 |
| 4,022,299 A | 5/1977 | Haraikawa | ................. | 188/71.9 |
| 4,121,697 A * | 10/1978 | Kobelt et al. | .............. | 188/72.7 |
| 4,228,875 A | 10/1980 | Haraikawa et al. | ........ | 188/72.7 |
| 4,457,408 A * | 7/1984 | Montalvo, III | ............. | 188/72.2 |
| 5,529,150 A | 6/1996 | Buckley et al. | ............ | 188/72.9 |
| 5,915,504 A | 6/1999 | Döricht | ...................... | 188/71.8 |
| 6,305,506 B1 * | 10/2001 | Shirai et al. | ............... | 188/72.2 |
| 6,318,513 B1 * | 11/2001 | Dietrich et al. | ............ | 188/72.7 |
| 6,752,247 B2 * | 6/2004 | Hartsock | .................... | 188/72.7 |
| 6,932,198 B2 * | 8/2005 | Trinh | ......................... | 188/72.7 |
| 6,957,723 B2 * | 10/2005 | Baumann et al. | .......... | 188/72.7 |
| 6,978,868 B2 * | 12/2005 | Schautt | ..................... | 188/72.7 |

OTHER PUBLICATIONS

International Search Report dated May 15, 2003.

\* cited by examiner

*Primary Examiner*—Robert A. Siconolfi
(74) *Attorney, Agent, or Firm*—St. Onge Steward Johnston & Reens LLC

(57) ABSTRACT

An electronically controlled disc brake with self-servo effect comprises a ramp plate provided with a brake pad for engagement with a brake disc, an actuator for applying a control force on the ramp plate substantially transverse to the brake disc, a ramp bridge, and rollers movable in ramps in surfaces facing each other of the ramp plate and the ramp bridge. The arrangement of these members is such that a movement of the ramp plate in the tangential direction of the brake disc will cause it to move towards or away from the brake disc.

16 Claims, 6 Drawing Sheets

DISC BRAKE

This application is a continuation of pending International Patent Application No. PCT/SE2003/000290 filed on Feb. 21, 2003, which designates the United States and claims priority of pending Swedish Patent Application No. 0200495.0 filed on Feb. 21, 2002 and U.S. Provisional Patent Application No. 60/359,720 filed on Feb. 27, 2002.

FIELD OF THE INVENTION

The present invention relates to an electronically controlled disc brake with self-servo effect.

BACKGROUND OF THE INVENTION

It is well known in the art that a self-servo effect for a disc brake on a vehicle may be obtained by applying a brake pad against the rotating brake disc, where the brake pad is tangentially movable in relation to the brake disc over inclined ramp means or the like.

The problem with such designs has hitherto been the relatively poor controllability, especially if hydraulic or pneumatic brake actuators have been used and if a great self-servo effect was desired.

We now see an increasing use of electronically controlled brake actuators, especially electric motors, which greatly improve the controllability of the brakes.

The main object of the invention is to accomplish a disc brake of this kind, which is as simple, cheap and effective as possible, providing a low level of actuation energy, low weight and high reliability, and which may provide the desired self-servo effect in both rotation directions of the brake disc, which is of importance not only for service braking but also for parking braking.

THE INVENTION

This may according to the invention be obtained in that a disc brake comprises a ramp plate provided with a brake pad for engagement with a brake disc, an actuator for applying a control force on the ramp plate substantially transverse to the brake disc, a ramp bridge, and rollers movable in ramps in surfaces facing each other of the ramp plate and the ramp bridge, the arrangement being such that a movement of the ramp plate in the tangential direction of the brake disc will cause it to move towards or away from the brake disc.

For enabling the ramp plate to obtain a position substantially parallel with the brake disc at all times, there are preferably two ramp and roller arrangements between the ramp plate and the ramp bridge, but in certain cases the number of such arrangements may be higher.

The ramp bridge is normally attached to a brake caliper placed astraddle of the brake disc.

The ramps may be straight or curved depending on the desired characteristics of the disc brake.

The movement of the rollers may be synchronized by means of a common roller cage, especially if the ramps are curved.

It has been stated that the actuator may be pneumatic or hydraulic, but it is preferred to use an electric motor as the actuator.

The control force may as a first alternative be applied by means of a control rod.

However, as a second and presently preferred alternative, the control force is applied over an eccenter mechanism between the ramp plate and the ramp bridge, the eccentricity of the mechanism and thus the distance between the ramp plate and the ramp bridge being adjustable by means of the electric motor.

In the force transmission from the electric motor there is preferably provided a brake means for keeping the outgoing shaft of the motor non-rotatable, when the motor is not energized for rotation in either of its two rotational directions.

In a practical embodiment the rotation of the electric motor is transferred to the eccenter mechanism via an angle transmission from a motor rod to a bevel gear disc, which is rotatably attached to the ramp bridge and is part of the eccenter mechanism.

Preferably the rotation of the electric motor is transferred to the eccenter mechanism via a bevel gear on the motor rod in engagement with the bevel gear disc, but alternatively a worm gear mechanism may be used instead of the bevel gear and the bevel gear disc.

As the ramp bridge may be movable in relation to the fixed motor, the bevel gear is axially movable on the motor rod by being in splines engagement therewith.

In order to obtain a brake clearance adjusting function of the disc brake, thus compensating for the wear of the brake pad at braking, the position of the ramp bridge in relation to the brake caliper may be adjusted in the direction transverse to the brake disc by means of two adjustment screws.

The two adjustment screws are preferably connected by means of a chain or the like for their synchronous rotation.

In order to provide—to a control system for the disc brake—a signal corresponding to the obtained tangential brake force, a force sensing means can be arranged between the ramp bridge and the brake caliper.

If a force sensing means is arranged at either side of the ramp bridge, signals are provided in both rotation directions and the disc brake may also be mounted in optional positions.

There may further be force sensing means between the adjustment screws and the caliper for providing a signal indicative of the axial brake force.

In a first preferred embodiment of an eccenter mechanism a crank rod is pivotably attached at one of its ends to the ramp plate and at its other end eccentrically to the bevel gear.

In a second embodiment of an eccenter mechanism a roller is eccentrically rotatably attached to the bevel gear and is in engagement with a slot in the ramp plate substantially parallel with the brake disc.

BRIEF DESCRIPTION OF THE DRAWINGS

The invention will be described in further detail below under reference to the accompanying drawings, in which.

DESCRIPTION OF EMBODIMENTS

Figure 1:
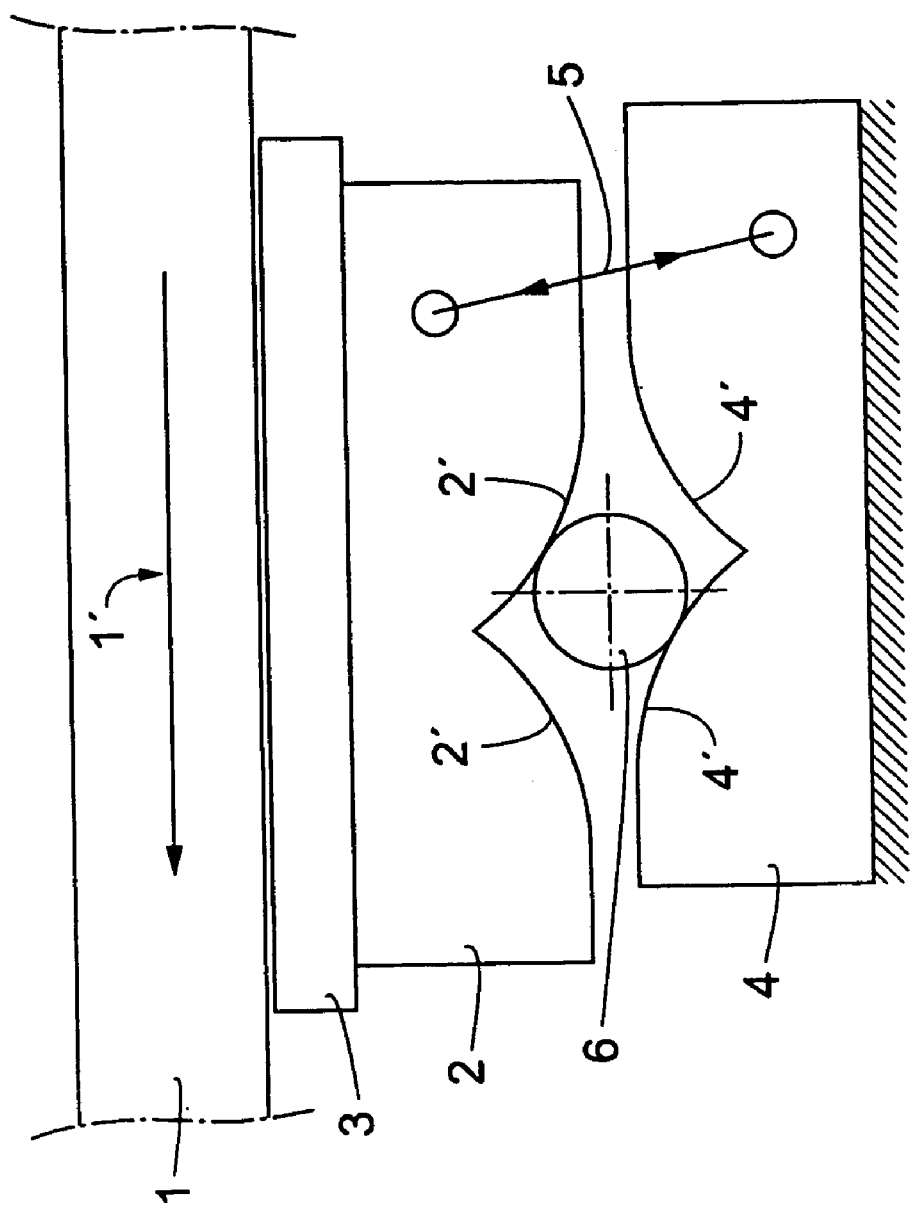
FIG. 1 is a very schematic top view of a disc brake arrangement for illustrating a principle of the invention.

As shown in FIG. 1, a brake disc 1 is rotating in the direction of an arrow 1'. A ramp plate 2 is provided with a brake pad 3 for braking engagement with the brake disc 1 at will. The ramp plate 2 is movably connected to a ramp bridge 4, which for the purpose of this simple explanation can be regarded as fixed, by a connecting means 5, here illustrated as a line.

At their surfaces facing each other, the ramp plate 2 and the ramp bridge 4 are provided with curved or straight ramps 2' and 4', respectively. A roller 6 is freely rotatable between the ramps 2' and 4'.

In a rest position (or a position for a non-applied brake) the unit comprising the ramp plate 2 (with its brake pad 3), the roller 6 and the ramp bridge 4 is held with the brake pad 3 at a small distance from the rotating brake disc 1 and with the roller 6 in the "bottoms" of the ramps 2' and 4'.

For brake application, a control force which is substantially transverse to the brake disc 1 (or in other words substantially axial) is applied on the ramp plate 2, in the shown case over the connecting means 5 as indicated by its upper arrow, until contact between the brake pad 3 and the disc 1 is established. By means of the friction force, the ramp plate 2 is transferred to the left in the drawing, so that the roller 6 rolls up the relevant ramps 2' and 4' and an application force is accomplished without applying any external brake force besides the control force. In other words the brake has a self-servo effect.

The application force may be controlled by the control force, which can be positive or negative. This is indicated by the provision of also a lower arrow on the connecting means 5, but is not further illustrated and described in connection with FIG. 1.

If the brake disc 1 rotates in the opposite direction, the arrangement will function in a similar way due to the provision of the respective double ramps 2' and 4'.

In the shown case the ramps 2' and 4' are curved, but they can alternatively be straight. By having a certain curvature of the ramps, a desired brake application characteristic can be obtained.

Figure 2:
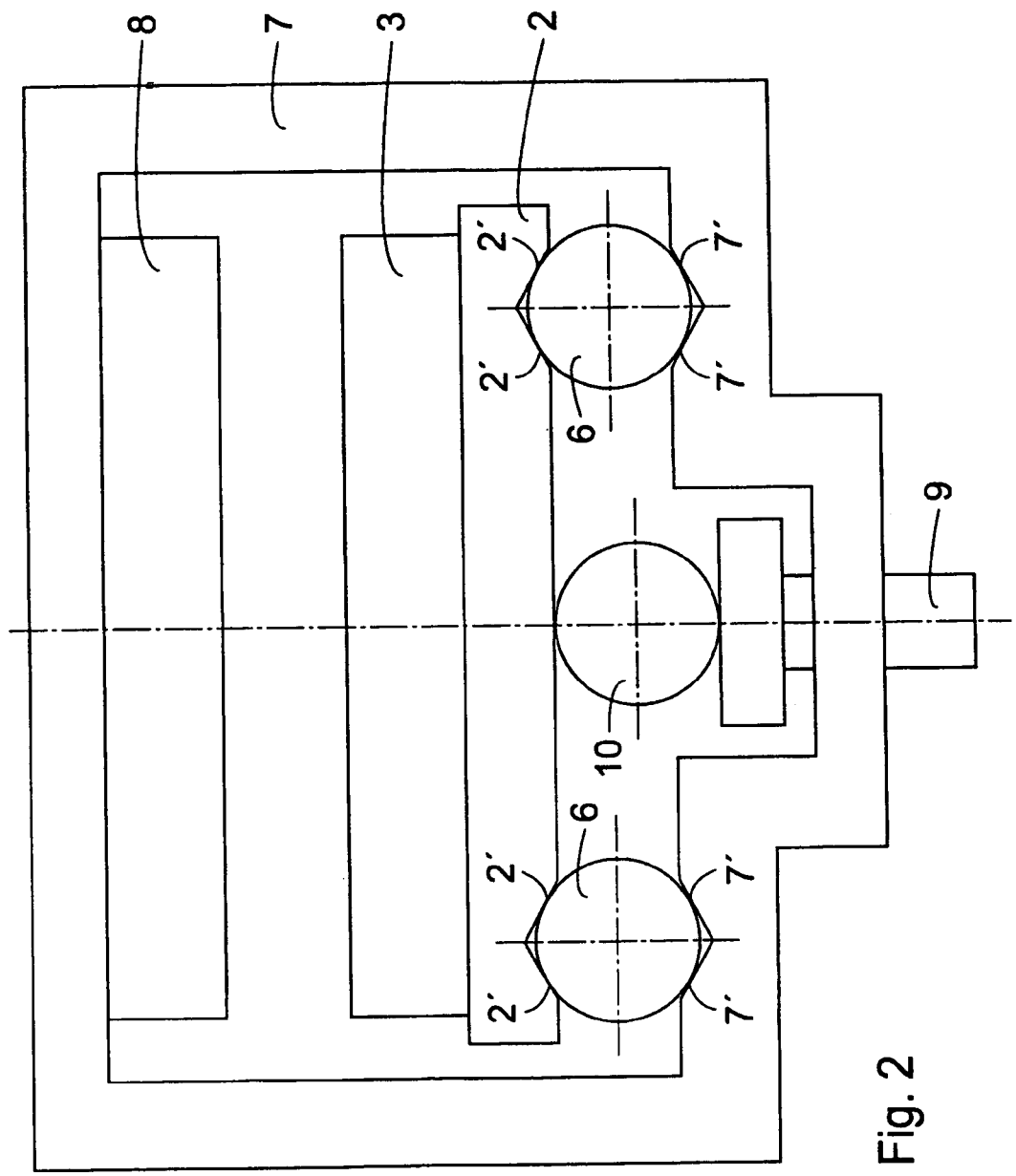
FIGS. 2 and 3 are schematic top views of disc brake calipers embodying the invention.

In FIG. 2 there is schematically shown a disc brake caliper 7 to be placed astraddle of a brake disc (not shown). The caliper 7 is provided with a fixed brake pad 8 at the side of the brake disc opposite the brake pad 3 of the ramp plate 2. Rollers 6 are arranged between double-sided ramps 2' on the ramp plate 2 and corresponding ramps 7' on the caliper 7. An axial control force can be applied to the ramp plate 2 by means of a control rod 9 acting on the ramp plate 2 via a roller or ball 10 for enabling the ramp plate 2 to move perpendicular thereto or tangentially with the brake disc (not shown).

In the same manner as has been described above, the ramp plate 2 will be transferred by friction forces between the brake disc (not shown) and the brake pad 3, and a brake application with self-servo effect will be accomplished by the rollers 6 rolling up the ramps 2' and 7'.

The provision of two rollers 6 is necessary in order to support the ramp plate 2 with its brake pad 3 substantially parallel with the brake disc.

In this arrangement the control force is applied by the control rod 9. By proper choice of ramp angles for non-self-locking of the brake pad 3 to the brake disc 1, the application force can be controlled by a control force that is always positive.

Figure 3:
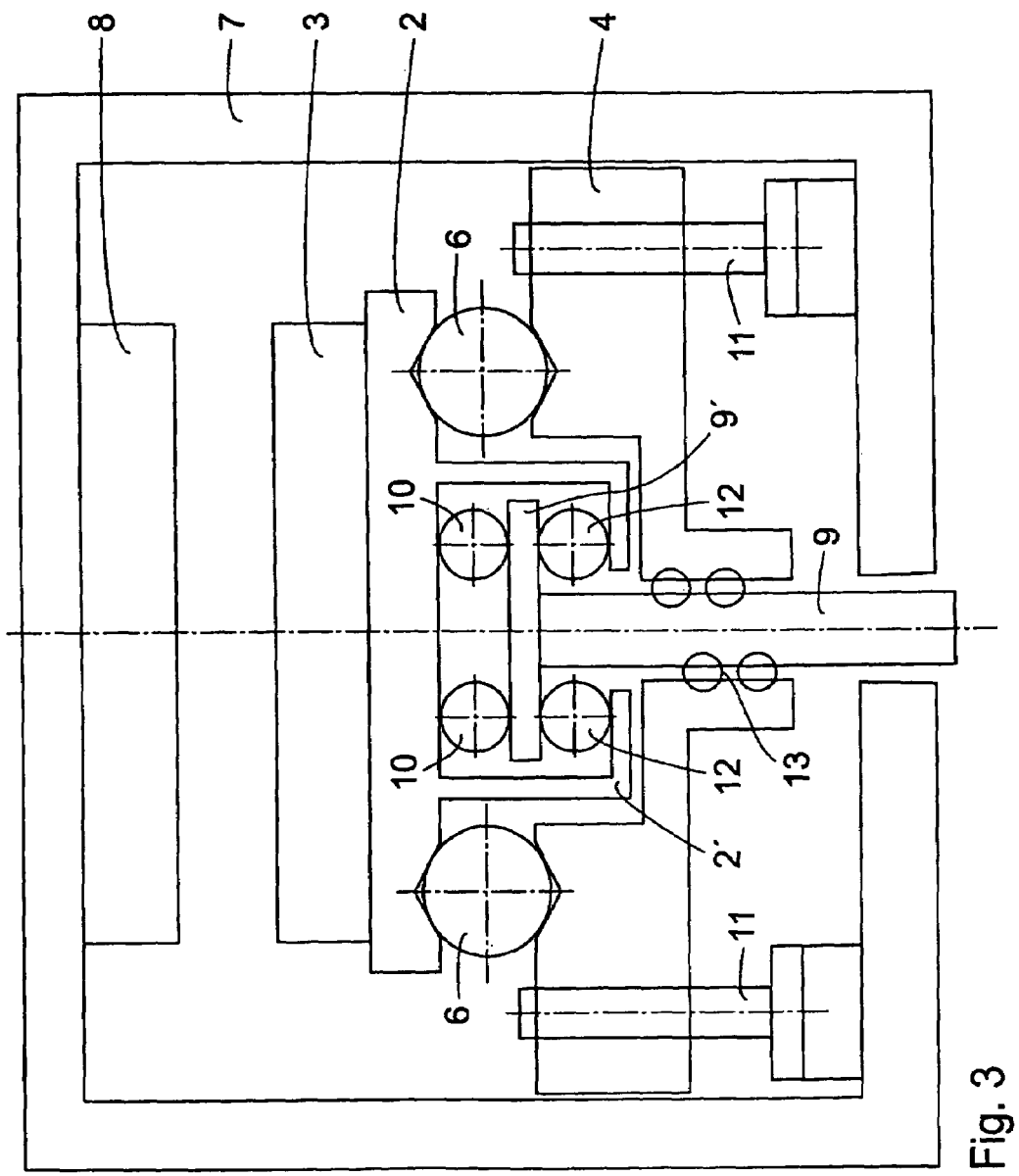

FIG. 3 shows a brake arrangement of substantially the same kind as that shown in FIG. 2 but with more features and a higher degree of sophistication.

Again, a disc brake caliper 7 is to be placed astraddle of a brake disc (not shown). The caliper 7 is provided with a brake pad 8. The ramp plate 2 is provided with a brake pad 3 on the opposite side of the brake disc. A ramp bridge 4 is supported by the caliper 7 by means of two adjustment screws 11. Two rollers 6 are arranged between ramps 2' and 4' in the ramp plate 2 and the ramp bridge 4, respectively.

A control rod 9 is axially movably guided in the ramp bridge 4 and applies a control force over a rod plate 9' acting on balls or rollers 10.

A negative control force on the ramp plate 2 can also be accomplished in that the ramp plate 2 is provided with a cage 2', on which return rollers 12 in contact with the rod plate 9' can act at a negative control force on the control rod 9. In practice the control rod may be rotated by an electric motor (not shown), and its axial movement may be accomplished by a ball screw arrangement 13 between the ramp bridge 4 and the control rod 9.

The purpose of the adjustments screws 11 is to properly position the ramp plate/bridge unit with the brake pad 3 at a small distance from the brake disc (not shown), ready for brake application.

The arrangement according to FIG. 3 will be fully controllable for instant applications and releases by the electric motor rotating the control rod 9, and the controllable self-servo effect is obtained in both rotation directions of the brake disc placed between the two brake pads 3 and 8.

Figure 4:
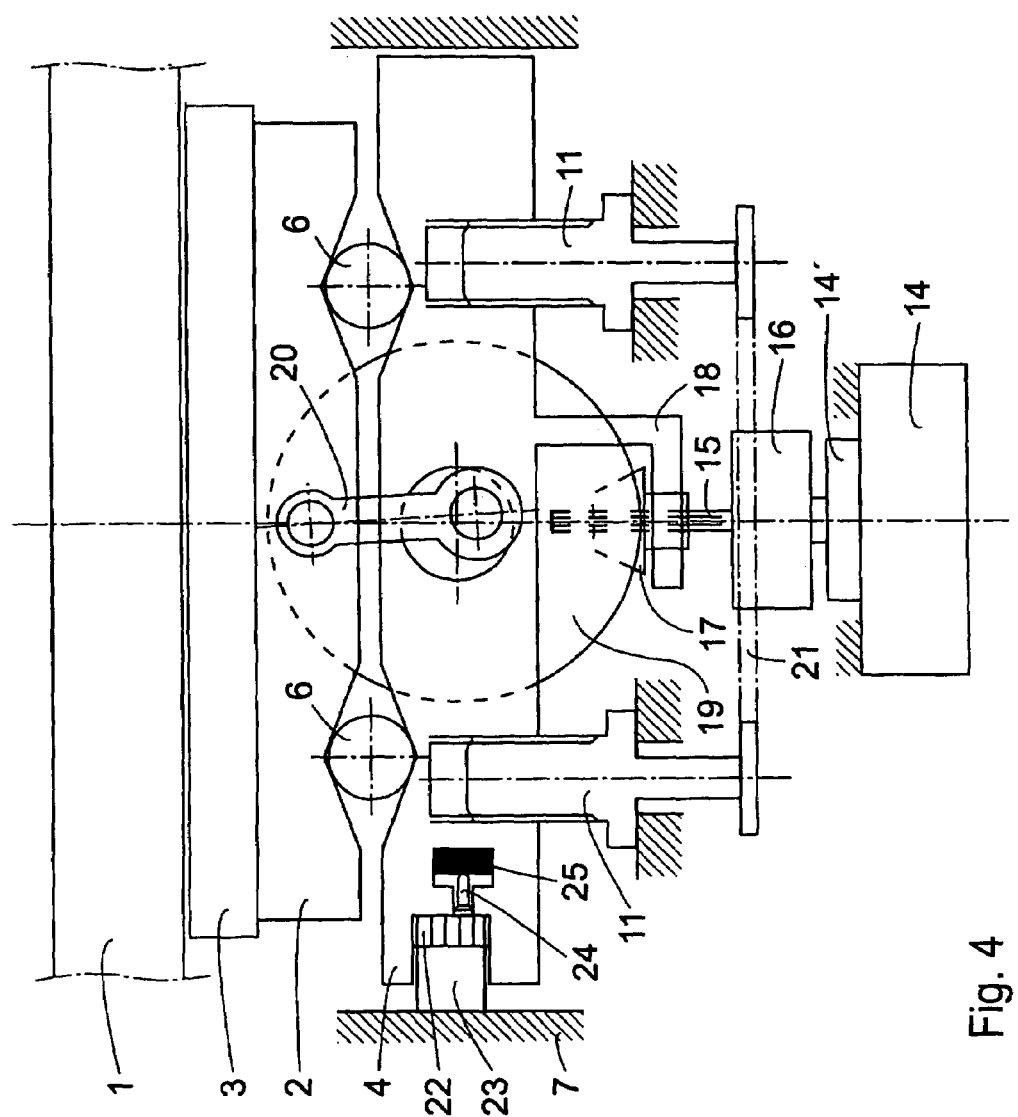
FIGS. 4-6 are schematic top views of embodiments of a disc brake according to the invention.

A disc brake arrangement shown in FIG. 4 has functional similarities with the one shown in FIG. 3. In this Figure the caliper is only indicated as attachment or support portions, whereas on the other hand the brake disc 1 is shown, with which the brake pad 3 on the ramp plate 2 is to cooperate.

The ramp bridge 4 is connected to the indicated caliper by means of two adjustment screws 11 in two threaded bores in the ramp bridge 4. Two rollers 6 are arranged between ramps 2' and 4' on the ramp plate 2 and the ramp bridge 4, respectively.

Although it is not shown in FIG. 4 or any other Figure, it may be advantageous for obtaining full control and a completely synchronous movement of the rollers 6 (irrespective of their actual number) to provide a common roller cage for the rollers 6, especially for curved ramps 2' and 4'.

The mechanism for creating the control force is different from that of FIG. 3.

An electric motor 14 can rotate a motor rod 15 in either direction over a rotational speed reducing gear box 16. A bevel gear 17 supported by an arm 18 from the ramp bridge 4 can be rotated by the rod 15 but is axially movable thereon by a splines engagement. The bevel gear 17 is in driving gear engagement with a bevel gear disc 19 rotationally supported by the ramp bridge 4. Eccentrically connected to the bevel gear disc 19 is a crank rod 20 rotationally connected to the ramp plate 2.

By turning the bevel gear disc 19 in either direction by means of the bevel gear 17 from the motor 14 over the gear box 16, the position of the ramp plate 2 in relation to the ramp bridge 4 can be set. In this case the control force is transmitted by the crank rod 20. When a friction engagement between the brake pad 3 and the brake disc 1 has been established an application force amplification will be accomplished by the rollers 6 climbing its ramps 2' and 4' in response to the tangential movement of the ramp plate 2 caused by the friction engagement with the brake disc 1. The application force may be accurately controlled by rotating the motor 14 in either direction.

The adjustment screws 11 have the purpose of adjusting the position of the ramp bridge 4 in relation to the wear of the brake pad 3 (and the corresponding brake pad on the opposite side of the brake disc 1). The synchronous rotation of the adjustment screws 11 is performed from the gear box 16 by a chain 21 in a way not further described.

In the force transmission from the motor 14 there may be provided an active or passive brake means 14' for the purpose of preventing the motor 14 from consuming current, when there is no command from the driver of the vehicle or the control system of the brake to rotate the motor in any direction. The brake means 14' accordingly has the function to keep the outgoing motor shaft non-rotatable, when the motor 14 is not energized to rotate in either of its two rotational directions.

In a disc brake with self-servo effect of the kind described herein it is of great importance to incorporate a control system for governing the rotation of the motor 14 for obtaining the desired brake function. An important parameter for this control function is the actual tangential brake force obtained. In the present case this parameter may be assessed in the following way.

A force sensing means of any suitable kind is arranged between the only indicated caliper 7 and the ramp bridge 4. Such a force sensing means can transmit signals indicative of the tangential brake force.

For example, a pressure-transmitting medium 22, preferably rubber, is arranged in a bore in the transverse end of the ramp bridge 4 and is acted on by a plunger 23 in contact with the caliper. A push rod 24 is in contact with the medium 22 at one of its ends and with a sensor element 25 at its other end. Signals indicative for the force applied by the push rod 24 and thus the pressure in the medium 22 can be transmitted from the sensor element 25 to the control system of the brake.

A similar force sensing means may also be arranged at the other end of the ramp bridge 4 for providing force signals at a rotation in the opposite direction of the brake disc 1 or in other words at reverse driving of the vehicle on which the brake arrangement is mounted. A further advantage with this is that the disc brake may be mounted at the left or right hand side of the vehicle.

Further, similar force sensing means (not shown) may be arranged between the caliper 7 and the adjustment screws 11 for obtaining signals indicative of the forces transverse to the brake disc 1 or in other words the axial forces to be supplied to the control system of the brake.

Figure 5:
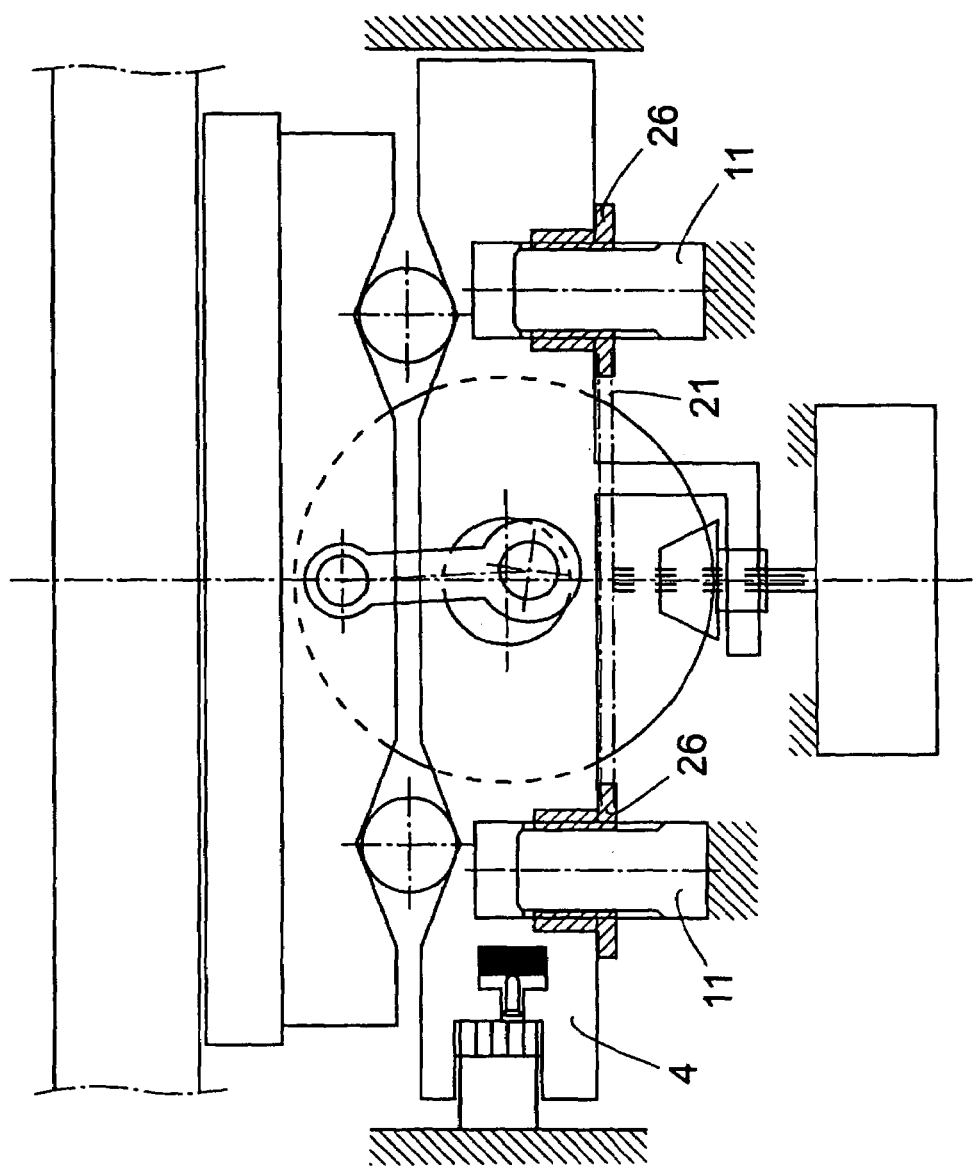

FIG. 5 shows a slightly amended version of the brake shown in FIG. 4. For the sake of clarity, reference numerals are only provided for parts that differ between the versions of FIGS. 4 and 5. (In FIG. 5—as well as in FIG. 6 to be described below—the motor brake means 14' and the gear box 16 are omitted.)

In the version according to FIG. 5 the adjustment screws 11 are non-rotatably attached to the caliper, whereas the ramp bridge 4 is provided with rotatable nuts 26 connected by a chain 21 for synchronous movement of the ramp bridge 4 at the two adjustment screws 11.

Figure 6:
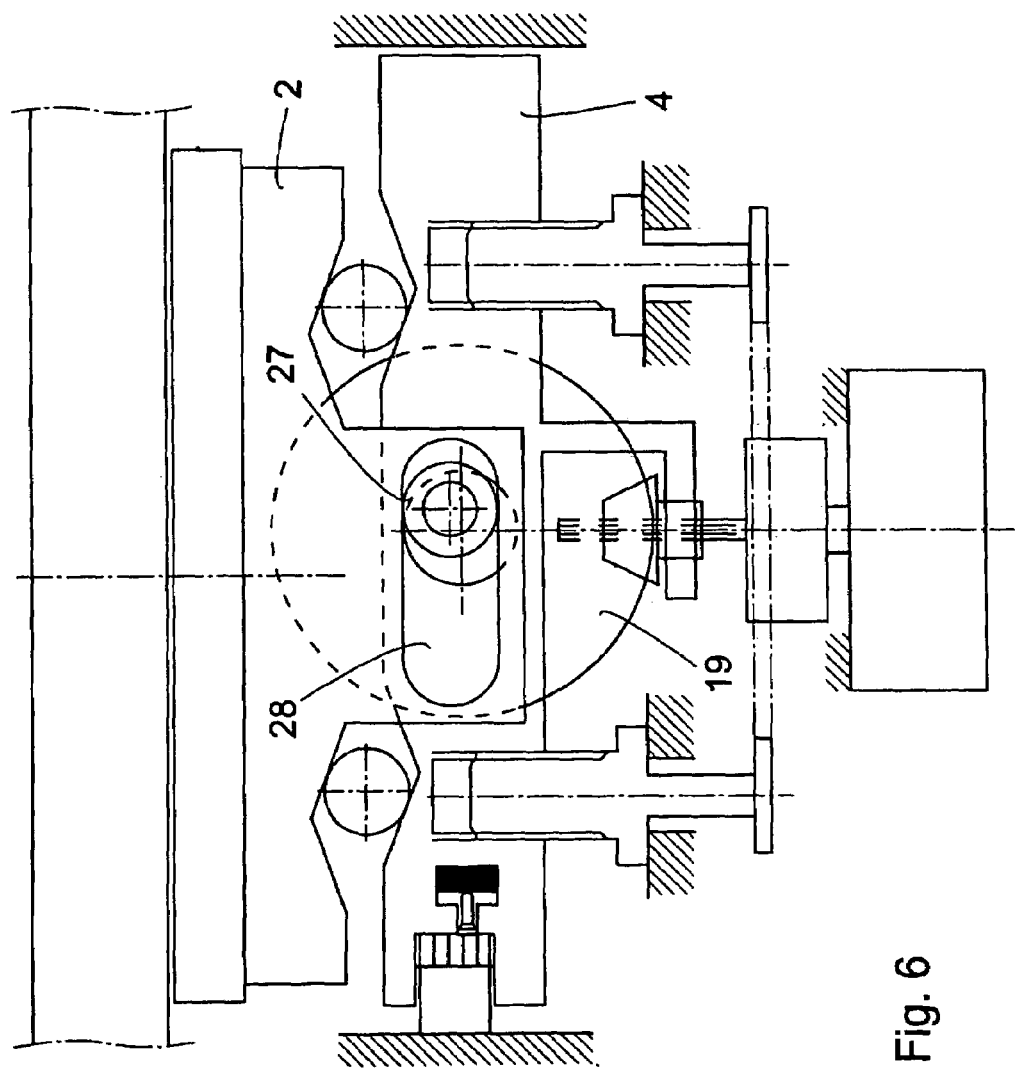

A further embodiment of FIG. 6 has many similarities with that of FIG. 4, and again only parts that differ between the two embodiments are described and provided with reference numerals.

In this embodiment there is no crank rod 20 from the bevel gear disc 19 on the ramp bridge 4 for eccentrically controlling the distance between the ramp plate 2 and the ramp bridge 4. Instead there is an eccentrically positioned roller 27 on the bevel gear disc 19 for cooperation with a slot 28 in a portion of the ramp plate 2 extending past the eccentric roller 27, said slot being substantially parallel with the brake disc 1 and having a width corresponding to the diameter of the roller 27. At a turning of the bevel gear disc 19 and a corresponding movement of the eccentric roller 27 in the slot 28 the mutual distance between the ramp plate 2 and the ramp bridge 4 will be changed.

For obtaining specific characteristics of the brake the slot 28 may alternatively be given a certain curve shape.

It is obvious that many modifications and improvements may be made within the scope of the amended claims. For example, in the embodiments according to FIGS. 2-6 the number of ramp and roller arrangements 2', 4', 6 is two in order to ensure that the ramp plate 2 is kept parallel to the brake disc 1, but the number of such arrangements may be higher for specific purposes. Further, in the embodiments according to FIGS. 4 and 5 the transmission by means of the bevel gear 17 and the bevel gear disc 19 may be replaced by a worm gear mechanism or any other type of angle transmission.

What is claimed is:

1. An electronically controlled disc brake with self-servo effect, comprising:
    a movable ramp plate provided with a brake pad for engagement with a brake disc,
    a ramp bridge, stationary in relation to the ramp plate,
    rollers movable in ramps in surfaces facing each other of the ramp plate and the ramp bridge, and
    means for applying a control force on the ramp plate substantially transverse to the brake disc,
    the arrangement being such that a movement of the ramp plate in the tangential direction of the brake disc will cause it to move towards or away from the brake disc,
    characterized in that the means for applying the control force on the ramp plate comprise a crank rod, pivotally attached at one of its ends to the ramp plate and at its other end eccentrically to a disc, which is rotatably connected to the ramp bridge and on which the control force can be applied.

2. A discbrake according to claim 1, wherein there are at least two ramp and roller arrangements between the ramp plate and the ramp bridge.

3. A discbrake according to claim 1, wherein the ramp bridge is attached to a brake caliper placed astraddle of the brake disc.

4. A discbrake according to claim 1, wherein the ramps are straight.

5. A discbrake according to claim 1, wherein the ramps are curved.

6. A discbrake according to claim 2, wherein a common roller cage is provided for the rollers.

7. A discbrake according to claim 1, wherein the control force is provided by an electric motor electronically controlled for rotation in either direction.

8. A discbrake according to claim 7, wherein there is provided in the force transmission from the electric motor a brake means for keeping the outgoing shaft of the motor non-rotatable, when the motor is not energized for rotation in either of its two rotational directions.

9. A discbrake according to claim 7, wherein the rotation of the electric motor is transferred to the ramp bridge disc via an angle transmission from a motor rod.

10. A discbrake according to claim 9, wherein the rotation of the electric motor is transferred via a bevel gear on the motor rod in engagement with the disc.

11. A discbrake according to claim 10, wherein the bevel gear is axially movable on the motor rod by being in splines engagement therewith.

12. A discbrake according to claim 3, wherein the position of the ramp bridge in relation to the brake caliper may be adjusted in the direction transverse to the brake disc by means of two adjustment screws.

13. A discbrake according to claim 12, wherein the two adjustment screws are connected by means of a chain or the like for their synchronous rotation.

14. A discbrake according to claim 3, wherein a force sensing means for transmitting a signal indicative of the tangential force is arranged between the ramp bridge and the brake caliper.

15. A discbrake according to claim 14, wherein a force sensing means is arranged at either side of the ramp bridge.

16. A discbrake according to claim 3, wherein a force sensing means for transmitting a signal indicative of the axial force is arranged between an adjustment screw and the brake caliper.

* * * * *

UNITED STATES PATENT AND TRADEMARK OFFICE
CERTIFICATE OF CORRECTION

PATENT NO.         : 7,258,206 B2
APPLICATION NO. : 10/507296
DATED               : August 21, 2007
INVENTOR(S)       : Lars Severinsson It is certified that error appears in the above-identified patent and that said Letters Patent is hereby corrected as shown below:

On Title Page Item (75) Inventor should read: Lars Mattis Severinsson, Hishult (SE)

Signed and Sealed this

Sixth Day of November, 2007

JON W. DUDAS
*Director of the United States Patent and Trademark Office*